Patented May 15, 1934

1,958,488

UNITED STATES PATENT OFFICE 1,958,488

RESIN AND COATING OR PLASTIC COMPOSITION CONTAINING THE SAME

William Henry Moss, Cumberland, Md., assignor to Celanese Corporation of America, a corporation of Delaware No Drawing. Application November 7, 1929, Serial No. 405,535

5 Claims. (Cl. 260—2)

This invention relates to the preparation of a synthetic resin from a chlor ketone and a phenol, and also to coating or plastic compositions containing derivatives of cellulose and particularly organic derivatives of cellulose.

An object of my invention is to prepare a synthetic resin that is compatible with derivatives of cellulose, and therefore suitable for use in films, lacquers or other coating compositions or plastics containing such derivatives of cellulose.

A further object of my invention is to provide a suitable resin for lacquers or plastic compositions containing derivatives of cellulose, which resin is compatible with the other constituents of the lacquers and which produces clear solutions which upon drying form films that are adherent, tough and hard and water-repellent.

The preparation of a lacquer containing organic derivatives of cellulose such as cellulose acetate as the main constituent of the lacquer base, which lacquer is to be applied to a hard, smooth surface presents many difficulties. This is due primarily to the fact that films from lacquers containing cellulose acetate as the sole constituent of the lacquer base do not adhere to smooth surfaces. When attempts are made to incorporate natural gums or resins in the lacquer containing cellulose acetate in order to impart the necessary adhesive qualities to the film produced from it, both the lacquer and the film produced become cloudy and unhomogeneous.

I have found that synthetic resins produced by the condensation of a chlor-ketone with a phenol in the presence of a suitable catalyst are compatible with cellulose acetate, and that when added to lacquers containing cellulose acetate they form clear solutions that upon drying produce clear, hard and tough and firmly adherent films.

In accordance with my invention, I prepare special synthetic resins formed by the reaction of a chlor ketone with a phenol in the presence or in the absence of a suitable catalyst such as hydrochloric or sulfuric acid. These synthetic resins are then used for making a lacquer or plastic composition which contains one or more derivatives of cellulose and a volatile solvent. The lacquer may contain also one or more natural or semi-synthetic resins or gums, one or more plastifiers or softening agents, medium and/or high boiling point solvents and preferably, but not necessarily, some pigments and/or dyes.

Solutions thus formed may be employed as a lacquer or coating composition for metal, glass or other surfaces and may be used for making photographic or other films. Artificial yarns may be formed by extruding the solution containing the derivative of cellulose and the special resin through the orifices of a spinnerette, either into a heated evaporative atmosphere as in dry spinning, or into a precipitating bath as in wet spinning. The solution may also be employed as an adhesive, and is particularly useful in this connection for making shatterless glass by causing celluloid sheets to adhere to surfaces of sheets of glass between which they are placed.

The plastic composition containing derivatives of cellulose and the special resin may be worked into sheets which may also be used for laminated glass, and also may be worked into blocks or articles in any known manner.

The derivatives of cellulose that may be used for making the solutions for coating or plastic compositions comprise any suitable derivative, such as cellulose nitrate or organic derivatives of cellulose. Examples of organic derivatives of cellulose are organic esters of cellulose such as cellulose acetate, cellulose formate, cellulose propionate and cellulose butyrate or cellulose ethers such as ethyl cellulose, methyl cellulose and benzyl cellulose.

The low boiling point solvent that may be employed may be one or a mixture of two or more of the following: acetone, alcohol, benzene or ethylene dichloride. Examples of medium and/or high boiling point solvents are ethyl acetate, ethyl lactate, tetrachlorethane, benzyl alcohol or diacetone alcohol. Of course it is understood that the choice of the solvents depends on the solubility characteristics of the particular derivative of cellulose employed. Examples of suitable plastifiers are diphenylol propane, triacetin, dibutyl tartrate, diethyl phthalate, mono methyl xylene sulfonamid. If desired, fire retardants may be added, particularly the very effective bromine derivatives of organic compounds, such as brominated tricresyl phosphate. The pigments or dyes that may be used may be those ordinarily employed in the paint or lacquer industry.

Of the natural gums or resins that may be added, the following may be mentioned: Manila, accaroides, pontianak, kauri, dammar, rosin and shellac. The semi-synthetic resin, ester gum, which is the glycerol ester of rosin may be also added. If desired, synthetic resins, other than the special chlor ketone-phenol resin may be employed in conjunction therewith, and examples of these are the fusible and soluble phenol-formaldehyde or diphenylol propane-formaldehyde resins preferably prepared in the presence of acid catalysts.

The special synthetic resin employed in this invention may be prepared by the condensation of a chlor ketone with a phenol in the presence of a suitable catalyst such as hydrochloric acid. While we prefer to use alpha-mono-chloracetone as one of the reactants any other suitable chlor acetone or other chlor ketone, such as mono chlor methyl-ethyl ketone may be used. The chlor-ketone is condensed with a phenol. The term "a phenol" includes not only the simple phenol, but also substituted phenols such as cresol or xylenol or higher homologues such as diphenylol propane. As examples of making the resin, the following is given:

*Example A*

| | Parts by weight |
|---|---|
| Phenol | 94 |
| Chloracetone | 46 |
| Concentrated hydrochloric acid | 10 | are heated together under reflux. A violent reaction takes place accompanied by much evolution of hydrochloric acid. In order to avoid a too rapid reaction, external cooling may be applied after reaction has started, or the materials may be merely mixed together without external heating, and allowed to react spontaneously. In 24 hours a semi-resinous material is produced by allowing the reaction to proceed in this manner without heating and in another 24 hours this semi-resinous material has become a hard resin. If the reaction is performed with heating, the same hard resinous material is produced in from 15 minutes to 1 hour. The resin may be purified by vacuum distillation or steam distillation, and may be washed with water or with water containing small proportions of alkali or organic solvents such as acetone or alcohol and it may be fused after such washings to produce a clear, transparent resin. It may be dissolved in alkali and reprecipitated by acid. As thus produced, the resin is usually brown to red in color, and has a melting point of about 110° C.

*Example B*

Ortho cresol is used in place of phenol in the above example and a very similar resin is produced.

*Example C*

Meta cresol is used in place of phenol in the above example and a somewhat lighter colored resin, and having a melting point of about 60° C, is produced.

*Example D*

| | Parts by weight |
|---|---|
| Chloracetone | 46 |
| Diphenylol propane | 228 |
| Hydrochloric acid | 10 | are condensed as above described. A very dark red resin is produced by the above procedure.

The resins thus produced are soluble in acetone, alcohol and most of the common solvents for cellulose acetate and are compatible with cellulose acetate in all proportions both in solution and in films, plastics, coating compositions, etc., and may be used in conjunction with the known plasticizers for cellulose acetate, together with dyes, pigments and other synthetic resins as desired.

It is to be understood that the foregoing detailed description is given merely by way of illustration, and that many variations may be made therein, without departing from the spirit of my invention.

Having described my invention, what I claim and desire to secure by Letters Patent is:

1. Method of preparing a synthetic resin which comprises reacting a chlor ketone and a phenol in the presence of hydrochloric acid as catalyst in an amount such that the weight of hydrogen chloride is about 6.5% of the weight of the chlor ketone and purifying the resin by distillation.

2. Method of preparing a synthetic resin which comprises reacting alpha chlor acetone and a phenol in the presence of hydrochloric acid as catalyst in an amount such that the weight of the hydrogen chloride is about 6.5% of the weight of the alpha chlor acetone and purifying the resin by distillation.

3. Method of preparing a synthetic resin which comprises reacting alpha chlor acetone and phenol in the presence of hydrochloric acid as catalyst in an amount such that the weight of the hydrogen chloride is about 6.5% of the weight of the alpha chlor acetone and purifying the resin by distillation.

4. Method of preparing a synthetic resin which comprises reacting 46 parts of alpha chlor acetone and 94 parts of phenol in the presence of concentrated hydrochloric acid as catalyst in an amount such that the weight of hydrogen chloride is about 6.5% of the weight of the alpha chlor acetone and purifying the resin by distillation.

5. A synthetic resin prepared in accordance with the process of claim 1.

WILLIAM HENRY MOSS.